United States Patent

[11] 3,625,272

[72] Inventor Henry R. Fletcher, deceased
late of Birmingham, England by Agnes
Marion Fletcher, legal representative
[21] Appl. No. 20,267
[22] Filed July 16, 1969
[45] Patented Dec. 7, 1971
[73] Assignee Dunlop Holdings Limited
[32] Priority July 16, 1968
[33] Great Britain
[31] 33,747/68

[54] PNEUMATIC TIRES
16 Claims, 1 Drawing Fig.
[52] U.S. Cl. ............................................ 152/357
[51] Int. Cl. ........................................... B60c 9/16
[50] Field of Search ............................. 152/357,
359, 361, 362

[56] References Cited
UNITED STATES PATENTS
2,792,868  5/1957  Benson ........................ 152/357
2,987,095  6/1961  Toulmin, Jr. ................. 152/357
3,032,963  5/1962  Fenner ......................... 152/357

Primary Examiner—James B. Marbert
Attorney—Stevens, Davis, Miller & Mosher

ABSTRACT: A pneumatic tire incorporating a flexible energy-absorbing layer of fine steel wires for protection of the carcass and/or breaker of the tire against damage by e.g. concussive forces or for reducing the transmission of vibrational energy from the ground of the carcass and thence to the vehicle to which the tire is fitted.

PATENTED DEC 7 1971
3,625,272
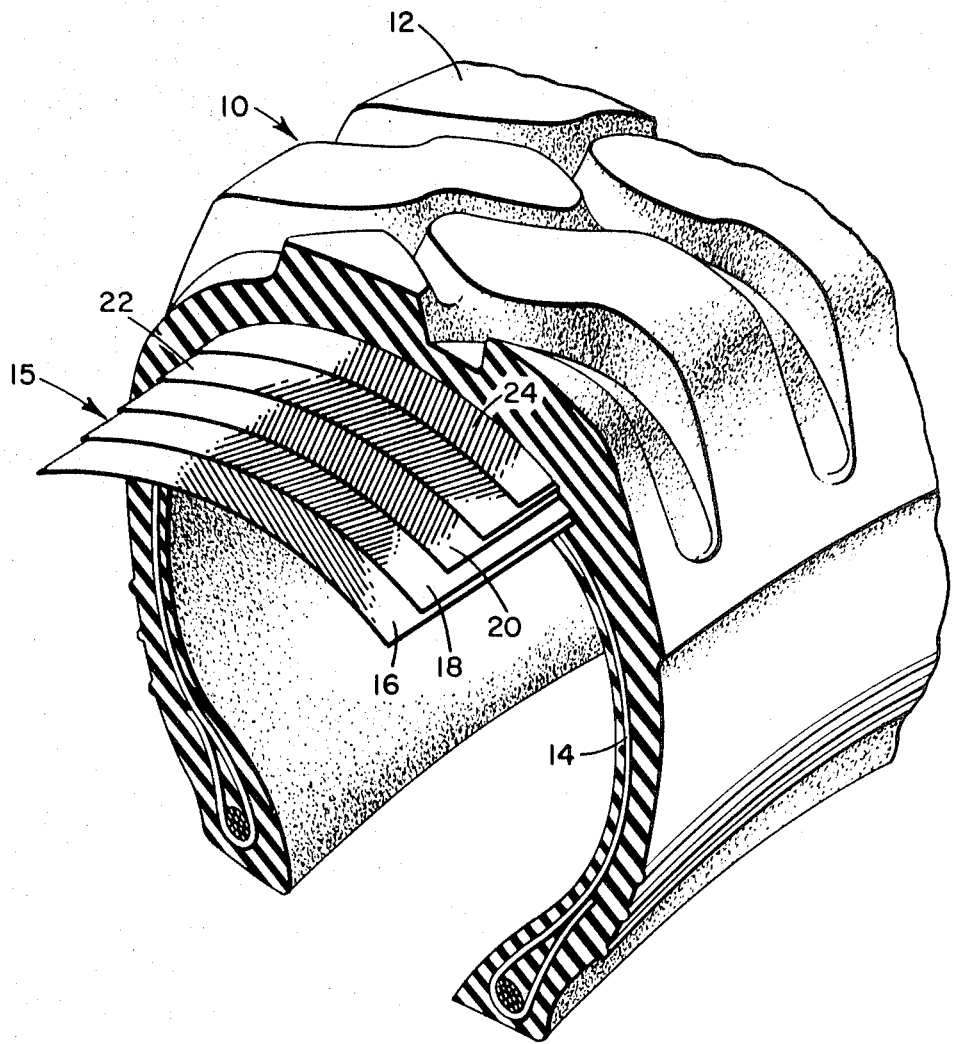
INVENTOR
HENRY R. FLETCHER
BY
*Stevens, Davis, Miller & Mosher*
ATTORNEYS

PNEUMATIC TIRES

This invention relates to pneumatic tires.

Some pneumatic tires hitherto known have one or more layers of parallel cord material e.g. beneath the tread, to act as an energy-absorbing barrier to reduce the transmission of vibrational and/or concussive forces from the ground either to the remainder of the tire or to the vehicle to which the tire is fitted.

It is an object of the present invention to provide an improved form of barrier which not only has a reduced energy transmission capacity but is less likely to fatigue or buckle under the effect of the said forces.

According to the present invention there is provided a pneumatic tire having a carcass reinforced with cords and an energy-absorbing layer, located externally of the carcass of steel wire cords disposed in substantially parallel side-by-side relationship, the individual wires in the cords having a diameter of substantially no greater than 0.003 of an inch. For example, the wires may have a diameter of substantially 0.0016 inch.

The carcass may be reinforced with steel cords or textile cords and the carcass cords may be disposed radially (90° bias) or at a bias angle.

More than one energy-absorbing layer may be provided and the layer or layers may comprise a breaker assembly. The assembly may also incorporate other layers of steel wire cord material, the individual wires having a diameter substantially greater than 0.003 of an inch.

The said energy-absorbing layer or layers may be disposed radially inwardly or outwardly of the remainder of the assembly and externally of the carcass in the crown region with the cords thereof disposed at substantially the same angle as the cords of the carcass to protect the carcass e.g. from concussive forces in rough usage conditions.

Alternatively the energy-absorbing layer may be disposed externally of one or both sidewall portions of the carcass, the cords being parallel to or making a small angle with the cords of the outermost carcass ply. The cords of the energy-absorbing layer may be disposed at substantially the same angle as the cords of the remaining breaker layers.

Embodiments of the invention will now be described in more detail by way of example with reference to the attached single FIGURE of drawings, showing a portion of a tire in cross section.

A pneumatic tire for an earthmover vehicle comprises a tread 12, a carcass 14, and a breaker assembly 15. The tread comprises deep traction lugs extending axially of the tire from the equatorial crown region of the tire to a shoulder thereof. The carcass 14 comprises a single layer of rubberized parallel steel cord material arranged such that the cords are disposed substantially at 90° to the midcircumferential plane of the finished tire. The breaker assembly 15 comprises five layers 16, 18, 20, 22 and 24 of rubberized parallel steel cord material, the diameter of the filaments of the cords of the radially inner three layers 16, 18 and 20 being approximately 0.006 inches and the diameter of the filaments of the cords of the radially outer pair 22 and 24 of breaker layers being approximately 0.003 inches. The cords of the radially inner three layers are disposed in known triangulated formation i.e. at angles of approximately 80°, 20° and 20° to the midcircumferential plane, and the cords of the radially outer pair of breaker layers are disposed at angles of approximately 20° to the midcircumferential plane of the tire but in an opposite sense to each other.

The outer layers of cord material comprising wires of 0.003 inches diameter are more flexible than the other layers in the breaker assembly. They are thus capable of resisting the concussive forces which act on the tire during use and prevent these forces from being transmitted to and possibly damaging the remainder of the breaker assembly and the carcass. In addition the layers themselves are less likely to fail from fatigue compared to layers of cord material comprising larger diameter wires incorporated in the breaker assembly for a similar protective purpose. The layer or layers are capable of resisting buckling more readily since under a compressive (i.e. concussive) load, the individual wires of the cords being of smaller diameter than hitherto used in tires, flex to a greater extent than the larger diameter wires and return to their original positions in the cord after the compressive load is removed without damage to the breaker or carcass cords occurring.

Additionally for a given cord strength, the use of a cord having a larger number of smaller diameter wires compared to a cord having a smaller number of larger diameter wires as hitherto used has the advantage that the local strain on the rubber surrounding each wire i.e. between wires in the cord and between the carcass and the energy-absorbing layer and/or between energy-absorbing layers is reduced when a compressive (i.e. concussive) load is applied.

A second embodiment of the invention comprises a radial ply passenger tire, in which two layers of steel wire cord material are incorporated in the breaker assembly 15 and located adjacent the carcass. The cords of the two layers comprise wires having a diameter of substantially 0.003 of an inch whereas the remainder of the breaker assembly comprises steel wire cord material, the individual wires of which have a diameter of substantially 0.006 of an inch.

The two layers incorporated in the tire result in a more flexible tread reinforcing band which is comparatively more capable of absorbing vibrations etc. arising from irregularities in the ground over which the tire is travelling than a band incorporating cords formed of larger diameter wires. Less vibration is thus transmitted to the vehicle to which the tire is fitted resulting in increased passenger comfort. Additionally a less "harsh" ride results.

A third embodiment comprises a belted-bias passenger tire incorporating a breaker assembly 15 similar to that described for the second embodiment. The carcass, having a cross-ply construction, is inherently less capable of flexing than a radial-ply carcass and the use of a more flexible tread band compared to those formed of cords of larger diameter wires improves passenger comfort considerably.

As a modification to each of the aforementioned embodiments the energy-absorbing layers may comprise 0.038-inch diameter steel cords each comprising two yarns each of which incorporates 14 individual wires 0.0016 inch in diameter, the yarns being folded together with substantially 7½ turns per inch to form each cord and the twist of the wires, as they lie in the cord, being substantially zero.

In all of the embodiments described the flexibility of cord material is increased over conventional material by the use of thin wires. However, the extensibility of the cords may also be increased by appropriate cord construction. The increased extensibility enhances or brings about similar improvements to those brought about by increased flexibility in all the aforementioned embodiments.

The present invention may be used in tire constructions incorporating the inventions of our copending patent applications 834,614 filed June 17, 1969, 20,266 filed July 16, 1969, 22,717 filed July 16, 1969 and 855,432 filed Sept. 4, 1969.

Having now described my invention what I claim is:

1. A pneumatic tire having a carcass reinforced with cords and an energy-absorbing layer, located externally of the carcass, of steel wire cords disposed in substantially parallel side-by-side relationship, the individual wires in the cords having a diameter of substantially no greater than 0.003 of an inch.

2. A pneumatic tire according to claim 1 wherein the wires have a diameter of substantially 0.0016 of an inch.

3. A pneumatic tire according to claim 1 wherein more than one energy-absorbing layer is provided.

4. A pneumatic tire according to claim 1 wherein the layer forms part of a breaker assembly.

5. A pneumatic tire according to claim 4 wherein the layer is disposed radially outwardly of the remainder of the assembly.

6. A pneumatic tire according to claim 5 wherein the cords of the energy-absorbing layer lie at substantially the same angle as the cords of the remaining breaker layers.

7. A pneumatic tire according to claim 5 wherein the cords of the energy-absorbing layer lie at substantially the same angle as the carcass cords.

8. A pneumatic tire according to claim 1 comprising a breaker assembly incorporating two energy-absorbing layers disposed radially outwardly of the remainder of the assembly, the cords of each layer making the same angle with, but in the opposite sense to, the midcircumferential plane of the tire.

9. A pneumatic tire according to claim 8 wherein the remainder of the breaker assembly comprises three layers disposed in triangulated formation.

10. A pneumatic tire according to claim 1 comprising a breaker assembly incorporating two energy-absorbing layers, the remainder of the assembly comprising steel wire cord material, the individual wires of which have a diameter of substantially 0.006 of an inch.

11. A pneumatic tire according to claim 1 wherein the energy-absorbing layer is disposed externally of at least one sidewall portion of the carcass.

12. A pneumatic tire according to claim 1 wherein the cords of the energy-absorbing layer have a diameter of substantially 0.038 of an inch.

13. A pneumatic tire according to claim 1 wherein the cords of the energy-absorbing layer each comprise two yarns folded together with substantially 7½ turns per inch.

14. A pneumatic tire according to claim 1 the carcass of which is of radial-ply construction.

15. A pneumatic tire according to claim 1, the carcass of which is of cross-ply construction.

16. A pneumatic tire according to claim 1 of belted-bias construction.

* * * * *